United States Patent [19]

Moore

[11] 4,411,944
[45] Oct. 25, 1983

[54] SURFACE MOUNTED TRIM PIECE

[75] Inventor: Ronald D. Moore, Grosse Pointe, Mich.

[73] Assignee: Chivas Products Limited, Sterling Heights, Mich.

[21] Appl. No.: 268,794

[22] Filed: Jun. 1, 1981

[51] Int. Cl.³ .............................................. B60R 13/02
[52] U.S. Cl. .................................... 428/172; 428/192; 428/319.7
[58] Field of Search ...................... 428/31, 192, 314.4, 428/315.9, 318.4, 319.3, 319.7, 172; 296/153; 293/1

[56] References Cited

U.S. PATENT DOCUMENTS

| 3,471,355 | 10/1969 | Truesdell et al. | 428/31 X |
| 3,528,872 | 9/1970 | Scholl et al. | 428/319.7 X |
| 3,745,056 | 7/1973 | Jackson | 428/31 X |
| 3,889,037 | 6/1975 | van den Berg | 428/319.7 X |
| 3,914,482 | 10/1975 | Sawa et al. | 428/31 |
| 3,952,383 | 4/1976 | Moore et al. | 428/31 X |
| 3,959,537 | 5/1976 | Loew | 428/31 |

Primary Examiner—Henry F. Epstein
Attorney, Agent, or Firm—Townsend and Townsend

[57] ABSTRACT

A trim piece for mounting to an interior panel of an automobile having a relatively rigid support member, foam padding, and an outer cover of vinyl or cloth. The cover and the foam padding are dielectrically bonded to the relatively rigid support member contiguous the edges of the trim member without enveloping the edges of the support member to provide a trim piece which mates with the surface of the interior panel. The method for making the trim piece involves using a dielectric die which defines an acute angle between an upper and lower die half, the acute angle being contiguous with the edge of the trim piece and being oblique with respect to the movement of the die halves. The lower die half mates with the support member and the upper die half mates with the vinyl cover at the points of dielectric bonding.

18 Claims, 10 Drawing Figures

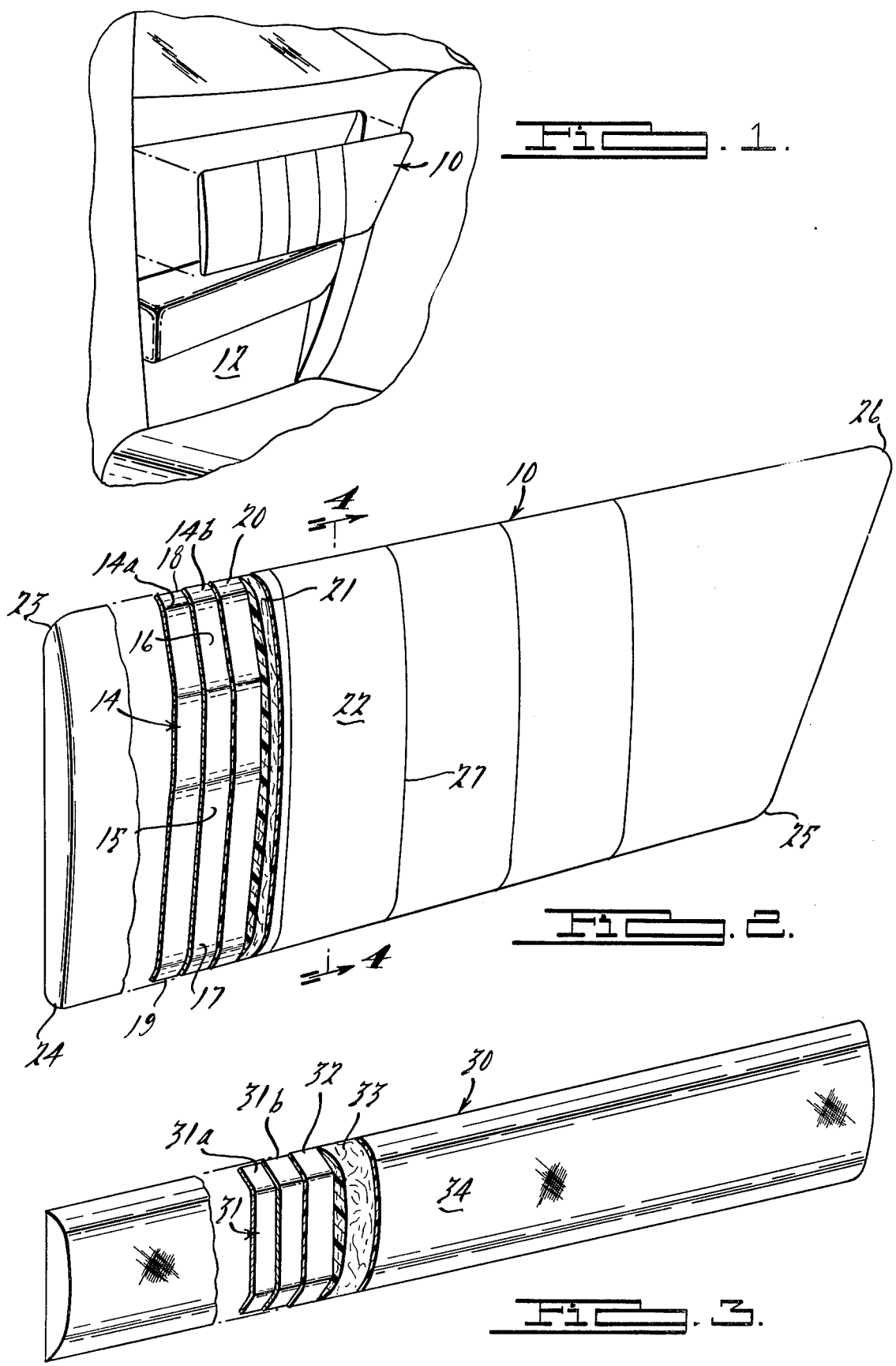

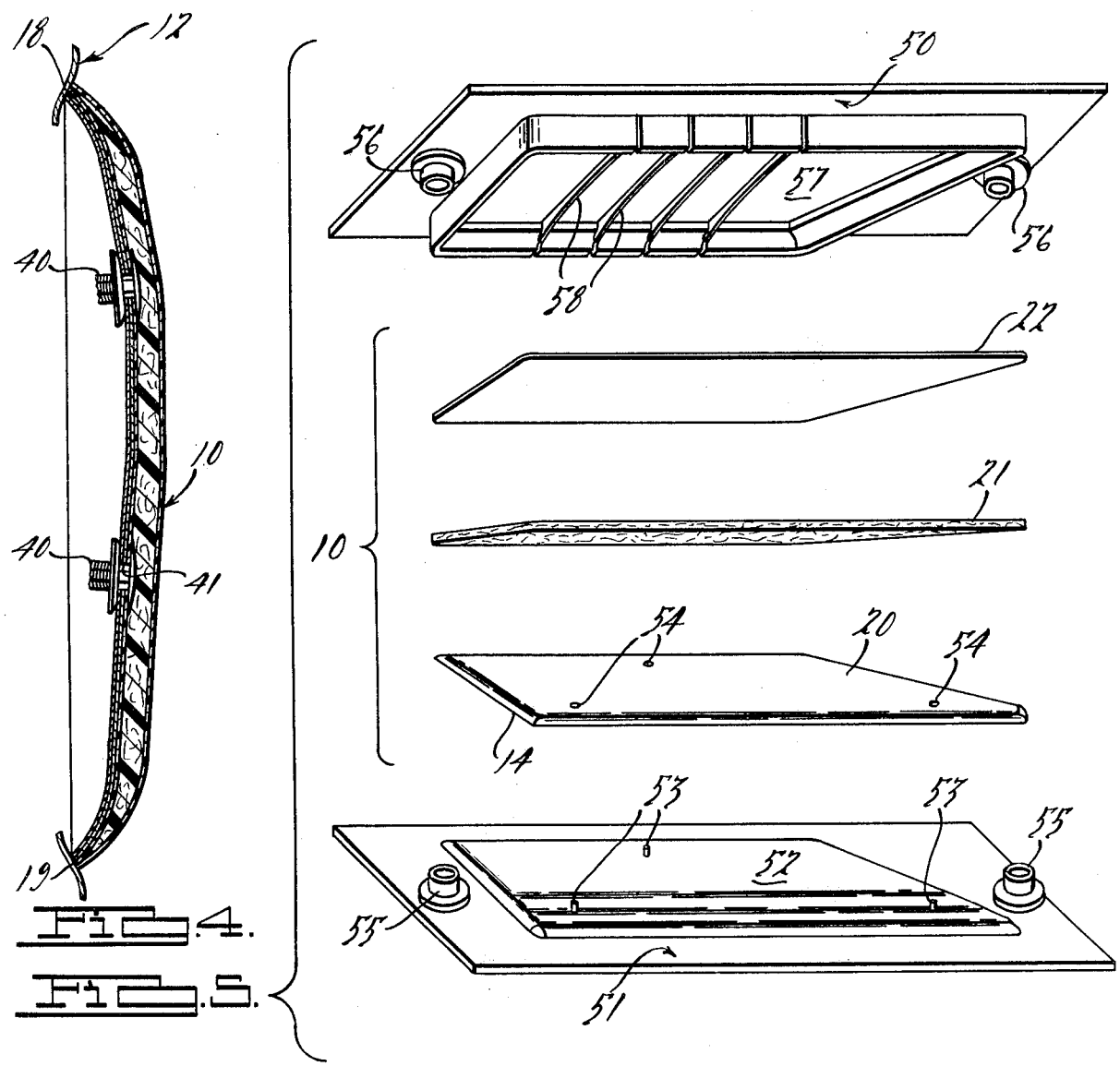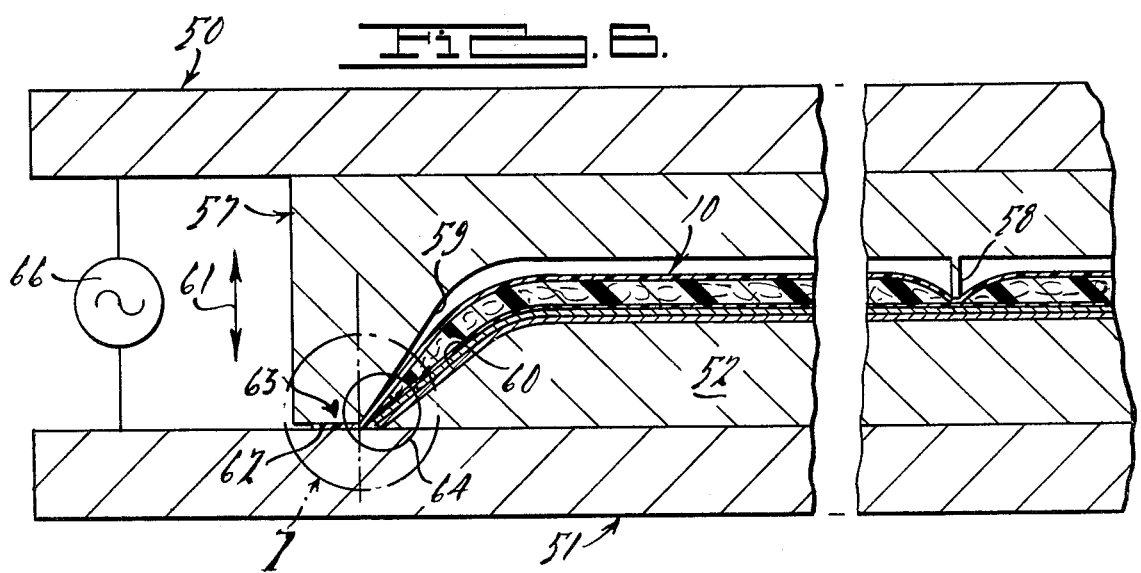

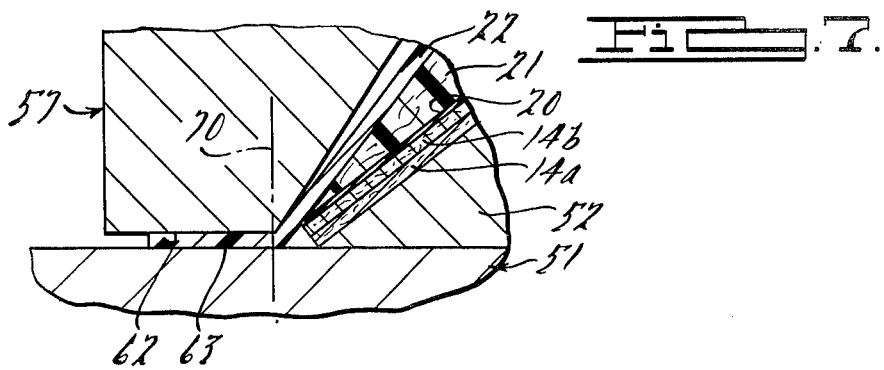
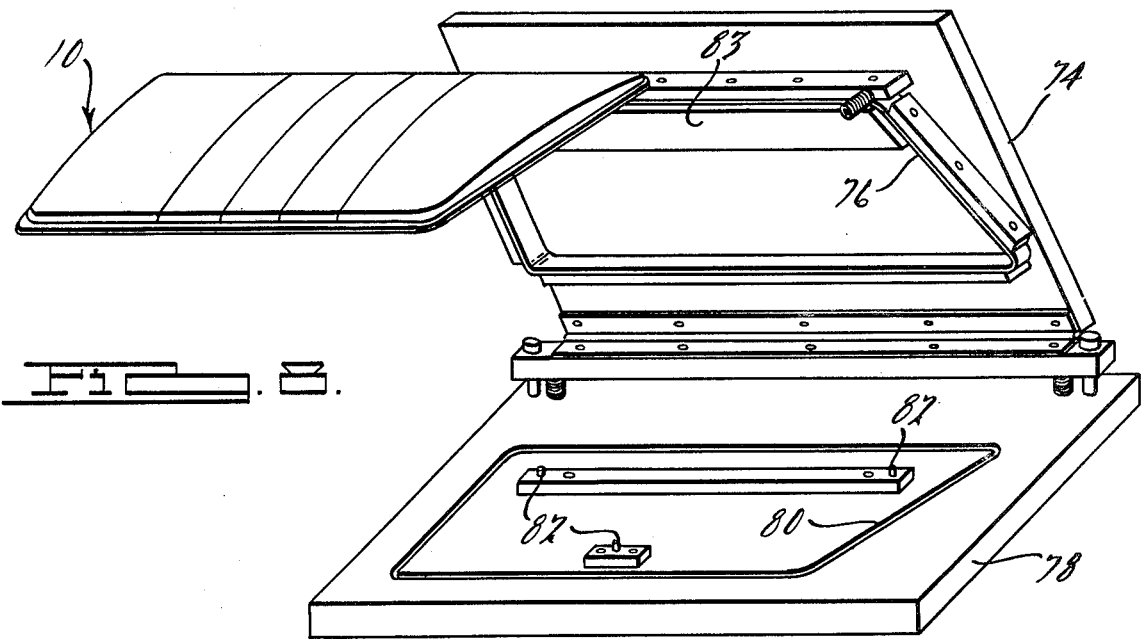
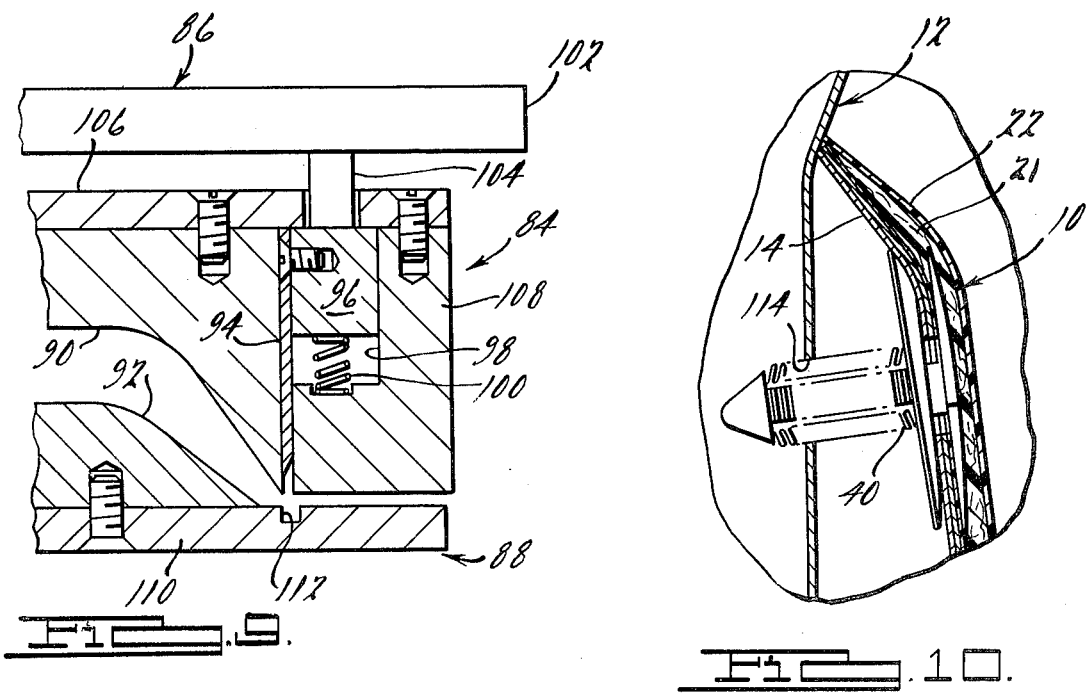

SURFACE MOUNTED TRIM PIECE

BACKGROUND AND SUMMARY OF THE INVENTION

In recent years large interior panels for automobiles have been molded in one piece out of a homogenous plastic material. These plastic interior panels have the advantage of being of low cost and weight and have a reasonably attractive appearance. However, since they are molded of a homogenous plastic material, they have a somewhat bland and austere appearance which is unsuitable for higher-price luxury automobiles. For use in luxury automobiles, trim features such as padded trim pieces are added to the molded interior panels to provide a luxurious appearance and feel. Padded trim pieces are made generally of a relatively rigid support member comprised of pressboard or the like, a foam pad and a vinyl covering for the foam.

In a known method of making padded trim pieces, the vinyl covering is wrapped around the edges of the trim piece and secured to the inside of the support member by gluing. Since the vinyl is wrapped about the edges of the trim piece, however, the vinyl tends to bunch at the corners of the trim piece. This bunching, of course, is unsightly. More importantly, this bunching results in an increased material thickness at the corners of the trim piece. Consequently, when the trim piece is mounted to the interior panel, the bunched material prevents a close mating between the edges of the trim piece intermediate the corners and the interior panel, resulting in unsightly gaps between the intermediate edges and the interior panel. Such unsightly gaps are, of course, antagonistic to a luxurious appearance. Also, gaps act as dirt traps and make cleaning difficult.

The present invention provides an improved interior trim piece consisting of a relatively rigid support member such as pressboard or the like, a foam or fibrous pad, and a vinyl or cloth cover which is secured to the support member in a fashion to avoid bunching at the corners of the trim piece. In accordance with this invention, the cover and the foam pad are constructed in a manner so that the edges of the trim piece mate nearly perfectly with the interior trim panel to provide a very attractive finished appearance with no gaps between the edges of the trim piece and the interior trim panel. In addition, this invention provides a trim piece which is capable of standing up to normal abuse without separation of the cover, pad and support member.

The improved trim piece of this invention is manufactured by a novel bonding method that utilizes dielectric, ultrasonic, or any other suitable bonding process, wherein the upper and lower surfaces of the bonding die form an acute angle proximate the edge of the trim piece and wherein said acute angle is obliquely disposed with respect to the motion of the upper and lower surfaces of the bonding die. The acute angle causes die convergence near the edge of the trim piece to provide a very secure bond between the cover, the pad, and the support member adjacent the edges of the trim piece. Because of the secure bond, the cover can be trimmed in a fashion which provides optimum mating with the interior panel to provide a finished appearance.

Other features and advantages of this invention will be apparent from the following description of the invention.

BRIEF DESCRIPTION OF THE DRAWINGS

FIG. 1 is a perspective view of an interior panel of an automobile illustrating a typical relationship of a trim piece of this invention to the interior panel of the automobile;

FIG. 2 is a perspective view, partially cutaway, of a trim piece according to the present invention illustrating the component parts thereof;

FIG. 3 is a perspective view, partially cut-away, of an alternative embodiment of a trim piece according to the present invention illustrating the component parts thereof;

FIG. 4 is a cross-sectional view of the trim piece of FIG. 2 mounted on an interior trim panel of an automobile;

FIG. 5 is an exploded view of the trim piece of FIG. 2 showing the components thereof in relationship to a pair of bonding die halves;

FIG. 6 is a cross-sectional view, broken away, showing the trim piece of FIG. 2 in a bonding die for bonding the vinyl cover and the foam pad to the support member;

FIG. 7 is an enlarged cross-sectional view of the portion of FIG. 6 indicated by the numeral 7, illustrating the angular relationship of the bonding die surfaces contiguous the edges of the trim piece and the relationship of the edges of the cover and the edges of the support member and pad of the trim piece;

FIG. 8 is a perspective view of the trim piece of FIG. 2 and of a cutting die for trimming flashing from the trim piece after bonding;

FIG. 9 is a cross-sectional view, broken away, of an embodiment of a bonding and trimming machine; and FIG. 10 is an enlarged cross-sectional view, broken away, of the trim piece of FIG. 2 mounted to an interior panel of an automobile and showing the relationship of the edge of the trim piece to the interior panel.

DETAILED DESCRIPTION OF THE PREFERRED EMBODIMENTS

Now referring to the figures, in FIG. 1, a portion of an interior of an automobile is illustrated showing a trim piece 10 according to the present invention and an interior panel 12. Interior panel 12 is a conventional large molded sheet of homogenous plastic material which is contoured to provide various interior features such as elbow rests and the like. Such interior panels are light in weight and are relatively inexpensive to produce. Additionally, they are reasonably attractive in appearance and easy to maintain. It has been found, however, that they are not sufficiently luxurious in appearance and feel to be appropriate for luxury automobiles. To meet the expectations of purchasers of luxury automobiles, it is necessary to add trim pieces which improve the appearance and feel of the interior panel. Trim piece 10 of the present invention is an improved trim piece which is well adapted to enhance the appearance and feel of interior panel 12.

As can be seen in FIG. 2, trim piece 10 has a relatively rigid support member 14 comprising two layers 14a and 14b of pressboard. Alternatively, support member 14 can be a single layer and/or can be constructed of molded plastic, metal or other suitable material. Support member 14 defines a contoured shape comprising a generally planar portion 15 and curved side portions 16 and 17 terminating in respective edges 18 and 19. The support member 14 has a plastic coating 20 which facilitates bonding as will be explained hereinafter. Trim piece 10 further includes a foam or fibrous pad or cushion 21 and a flexible outer cover 22 which can be manufactured from vinyl, cloth, or any other suitable material. Trim piece 10 has a plurality of corners, including right-angular corners 23 and 24, oblique corner 25 and acute corner 26. The trim piece 10 may have various decorative and functional relief lines formed therein such as decorative lines 27.

In FIG. 3, an alternative embodiment of an elongated trim panel 30 according to the present invention is illustrated. The trim panel 30 has a pressboard support member 31 comprising layers 31a and 31b. Similarly to the previous embodiment, the support member 31 has a plastic coating 32 to facilitate a heat bonding process, e.g. dielectric or ultrasonic bonding. The trim panel 30 also has a foam pad 33 and flexible outer cover 34. Flexible outer cover 34 comprises a cloth material which is either itself suitable for heat bonding or has an undercoating which facilitates such heat bonding.

Now referring to FIG. 4, a cross-sectional view of trim piece 10 mounted to interior panel 12 is illustrated. Trim piece 10 is attached to panel 12 by means of fasteners 40 which extend through aligned openings 41 in support member 14 and plastic coating 20 and project into interior panel 12. Edges 18 and 19 of trim piece 10 closely mate with the interior panel 12 to provide a neat finished appearance as will be better described hereinafter. Note that the trim piece 10 is amply padded substantially throughout so as to provide a luxurious feel as well as a luxurious appearance.

Now referring to FIGS. 5, 6, 7, and 8, the novel process for manufacturing trim strip 10 is illustrated. FIG. 5 shows an exploded view of the component parts of trim piece 10 between bonding die halves 50 and 52. Before bonding, support member 14 is shaped or molded by any conventional process to the desired final form and coated with plastic layer 20. Foam padding 21 is sized slightly smaller than support member 14 and vinyl cover 22 is oversized with respect to support member 14. Alternatively, foam padding 21 can also be slightly oversized in relation to support member 14.

In carrying out the bonding process, the pressboard support member 14 is placed upon lower die half 51 which is provided with a formed die portion 52 that is configured to closely mate with support member 14. Die portion 52 has three alignment pegs 53 which serve to properly position support member 14 upon die portion 52. The three alignment pegs 53 are received by correlative alignment openings 54 in support member 14. Foam padding 21 is laid over support member 14 and vinyl cover 22 is in turn laid over the foam padding. When support member 14, foam padding 21, and vinyl cover 22 are in proper position, upper die half 50 of the bonding die is brought into position by a suitable press. To insure proper alignment of die halves 50 and 51, two alignment pins 55 on lower die half 51 and two alignment sleeves 56 on upper die half 50 are provided. Upper die half 50 is provided with an upper formed die portion 57 which registers with lower formed die portion 52. Additionally, upper formed die portion 57 contains a plurality of ribs 58 for providing relief features on trim piece 10. However, while upper formed die portion 57 registers with lower formed die portion 52, upper formed die portion 57 only contacts trim piece 10 where bonding is to be effected.

The novel bonding process of this invention is illustrated in the cross-sectional view of FIG. 6. In FIG. 6, upper formed die portion 57 has a surface 59 which forms an acute angle with an opposing surface 60 on lower formed die portion 52. Surfaces 59, and 60, and the acute angle formed thereby, are obliquely disposed with respect to the relative direction of travel of die halves 50 and 51, such direction being indicated by arrow 61. Upper formed die portion 57 has a lower flashing surface 62 which is perpendicular to the direction of travel 61 and which forms a flashing 63 of trim piece 10.

The functional bond is provided in part by surfaces 59 and 60 in a zone 64 which is adjacent, i.e., at and near, the edge of the trim piece 10 as subsequently trimmed. The flashing surface 62 does no more than form or spread the flashing material as described below. In this manner, the bond is formed at the edge of trim piece 10 and sufficiently back from the edge towards trim piece 10 to give a functional bond sufficient for automobile or other such similar usage. Once the die halves 50 and 51 are brought together under pressure to compress the components of trim piece 10 as illustrated in FIG. 6, radio-frequency energy from a source schematically illustrated at 66 is passed between formed die portions 52 and 57 to heat vinyl cover 22, foam pad 21, and plastic coating 20 to provide the functional dielectric bond in zone 64, and at ribs 58. Alternatively, other types of bonding processes such as ultrasonic bonding can also be utilized to provide the requisite friction heat that will effect the desired functional bond.

To better illustrate the relationship of the surfaces 59 and 60 near zone 64, an enlarged view thereof is provided in FIG. 7 which is taken from the portion of FIG. 6 encircled by dashed lines "7." In FIG. 7, it can be seen how the foam padding 21 and vinyl cover 22 are compressed in zone 64 to provide a near-solid mass near the edge of trim piece 10 as subsequently trimmed. When practicing the present invention according to the preferred embodiment, foam padding 21 is sized to stop short of the edge of support member 14. Therefore, vinyl cover 21 extends outwardly alone between lower formed die portion 52 and flashing surface 62 to form flashing 63. If, according to an alternative embodiment, foam padding is sized to extend beyond the edge of support member 14, foam padding 21 along with vinyl cover 22 will extend outwardly as a near-solid mass of material between lower formed die portion 52 and flashing surface 62 to form flashing 63. In a subsequent step that will be more fully described, flashing 63 is sheared or trimmed along dashed line 70 to provide a clean finished edge. The edge of support member 14 generally lies contiguous, i.e., at or near, the sheared or finished edge of trim piece 10 such that support member 14 lies slightly inwardly of the sheared edge and vinyl cover 22 extends outwardly of the sheared edge. In this way, a smooth single layer at the finished edge of trim piece 10 is provided having substantially the contour of support member 14.

As shown in FIG. 8, the shearing of flashing 63 occurs in a fixture that has an upper shearing half 74 provided with knife edges 76 and a lower shearing half 78 provided with shearing slots 80. Knife edges 76 are precisely mounted to define the finished or sheared edges of trim piece 10. Knife edges 76 define the finished edges of trim piece 10 slightly outwardly of the preformed edges of the support member 14. The finished edges of trim piece 10 are thus formed so that the edges of vinyl cover 22 extend slightly beyond the edges of support member 14 thereby providing a smooth finished appearance when the edges of the completed trim piece 10 mate with the surface of interior panel 12. Shearing slots 80 are positioned in registration with knife edges 76 to provide a vertically clean shear of flashing material 63 from trim piece 10. Lower shearing half 78 of the shearing fixture is provided with three locating pins 82 which mate with the previously described openings 54 in support member 14. Once trim piece 10 with flashing 63 is placed on lower shearing half 78 of the shearing fixture, with locating pins 82 residing in openings 54 of support member 14, upper shearing half 74 is rotated downwardly. The shearing function is thereafter accomplished by compressing the shearing fixture in a suitable press. In this manner, flashing 63 is removed from trim piece 10 and a shear along line 70 is efficiently and cleanly accomplished.

FIG. 9 illustrates an embodiment of a machine that is constructed to accomplish both bonding and shearing in a single fixture 84. Fixture 84 has an upper fixture half 86 and a lower fixture half 88. Upper fixture half 86 includes an upper dielectric die portion 90 while lower fixture half 88 includes a lower dielectric die portion 92. Upper fixture half 86 also includes a shearing knife 94 which is mounted on a shearing knife block 96. Shearing knife block 96 is disposed for up and down sliding movement within a cavity 98 and is biased upwardly by a plurality of compression springs 100. A press plate 102 having press pins 104 engage the upper surface of shearing knife block 96. Upper fixture half 86 also includes an upper joining plate 106 which is secured to upper dielectric die portion 90 and an upper fixture frame 108 by suitable fasteners as shown. The frame 108 defines cavity 98 for the shearing knife block 96.

Lower fixture half 88 is provided with a lower joining plate 110 having shearing slots 112 which are positioned in registration with the edges of shearing knives 94. Lower joining plate 110 is secured to lower dielectric die portion 92 by suitable fasteners as shown. Lower dielectric die portion 92 is essentially of the same configuration as lower formed die portion 52 depicted in FIG. 6 whereas upper dielectric die portion 90 is of essentially the same configuration as upper formed die portion 57.

In the use of bonding and shearing fixture 84, support member 14, foam padding 21, and vinyl cover 22 are placed upon lower dielectric die portion 92 and properly positioned by locating pins 82 and openings 54. Upper fixture half 86 is thenafter brought into position by a suitable press and a first predetermined magnitude of pressure is brought to bear across fixture 84. This first predetermined pressure is of a magnitude sufficient to cause dielectric type bonding continguous the edges of trim piece 10 as previously described when an appropriate amount of radio-frequency energy is provided to upper and lower dielectric die portions 90 and 92. This first predetermined pressure is also of a magnitude that only partially compresses springs 100, i.e., a degree of compression which does not cause shearing of the trim piece flashing by shear knife 94. When the dielectric type bond is complete, the pressure brought to bear across fixture 84 by the press is raised to a second predetermined level or magnitude which is then sufficient to further compress springs 100 and move shearing knife 94 into shearing slot 112 to shear the flashing from trim piece 10. Thereafter, upper fixture half 86 is lifted from lower fixture half 88 and the completed trim piece 10 is removed. As previously indicated, suitable bonding techniques other than dielectric bonding could be used in this process.

With reference now to FIG. 10, the relationship of trim piece 10 to interior panel 12 is illustrated. Fasteners 40 are shown engaging openings 114 in interior panel 12. It can be seen that the edge of vinyl cover 22 is in intimate contact with the surface of interior panel 12. This intimate contact is facilitated by the clean shear previously described. This intimate contact is also facilitated by the fact that the edge of support member 14 terminates slightly inwardly of the edge of vinyl cover 22. Vinyl cover 22, being relatively yieldable beyond where it is supported by support member 14, yields slightly to make the finished-appearance engagement with interior panel 12.

While it is apparent that the preferred embodiments of the invention disclosed are well calculated to provide the advantages and features stated, it will be appreciated that the invention is susceptible to modification, variation, and change without departing from the proper scope or fair meaning of the subjoined claims.

What is claimed is:

1. A trim piece for attachment to a vehicle surface comprising:
   a relatively rigid support member, said support member having an unbeveled edge;
   a foam padding adjacent said support member; and
   a cover exterior of said padding securely bonded to the face side of said support member adjacent said edge of said support member so as to encapsulate said padding and terminating contiguous and slightly beyond said edge without enveloping said edge so that, upon attachment of said trim piece to said surface, the cover will engage said surface substantially at the termination of said cover.

2. A trim piece according to claim 1, wherein said cover is secured to the face side of said support member in a narrow zone contiguous said edge.

3. A trim piece according to claim 2, wherein said narrow zone continues around the periphery of said edge of said support member.

4. A trim piece according to claim 2, wherein said padding terminates in said narrow zone.

5. A trim piece according to claim 1, wherein said trim piece is mounted to an interior panel of a vehicle using one or more mounting fasteners which are secured to first openings in said support member and which project through corresponding second openings in said interior panel.

6. A trim piece for attachment to a vehicle surface comprising:
   a relatively rigid support member, said support member having at least one planar portion and an unbeveled edge, said support member contiguous said edge forming an acute angle to a direction perpendicular to said planar portion;
   a foam padding adjacent said support member; and
   a cover exterior of said padding which is bondable by heat to the face side of said rigid support member, which is securely bonded by dielectric heating to said support member contiguous said edge and which terminates slightly beyond said edge without enveloping said edge so that, upon attachment of said trim piece to said surface, the cover will engage said surface substantially at the termination of said cover.

7. A trim piece according to claim 6, wherein said support member has a plastic layer coating to facilitate said bonding.

8. A trim piece according to claim 6, wherein said cover is secured to the face side of said support member in a narrow zone contiguous said edge.

9. A trim piece according to claim 8, wherein said narrow zone continues around the periphery of said edge of said support member.

10. A trim piece according to claim 8, wherein said padding terminates in said narrow zone.

11. A trim piece according to claim 6, wherein said trim piece is mounted to an interior panel of a vehicle using one or more mounting fasteners which are secured to first openings in said support member and which project through corresponding second openings in said interior panel.

12. A vehicle trim piece for attachment to an interior panel of the vehicle comprising:

a relatively rigid support member, said support member defining substantially the final form of said trim piece, said support member having corners and an unbeveled edge, said support member adjacent said edge forming an acute angle to a direction perpendicular to said interior panel;

a flexible cover, said cover being secured to the face side of said support member adjacent said edge and terminating contiguous and just outwardly said edge without enveloping said edge to provide a smooth single layer at said edge and having substantially the contour of said support and so that, upon attachment of said trim piece to said panel, the cover will engage said surface substantially at the termination of said cover; and a foam pad disposed between said support member and said cover such that said cover encapsulates said pad.

13. A trim piece according to claim 12, wherein said cover is bonded by heat to the face side of said support member and is securely bonded by dielectric heating to said support member contiguous said edge.

14. A trim piece according to claim 13, wherein said support member has a plastic layer coating to facilitate said bonding.

15. A trim piece according to claim 12, wherein said cover is secured to the face side of said support member in a narrow zone contiguous said edge.

16. A trim piece according to claim 15, wherein said narrow zone continues around the periphery of said edge of said support member.

17. A trim piece according to claim 15, wherein said pad terminates in said narrow zone.

18. A trim piece according to claim 13, wherein said trim piece is mounted to an interior panel of a vehicle using one or more mounting fasteners which are secured to first openings in said support member and which project through corresponding second openings in said interior panel.

* * * * *